US012625703B2

(12) United States Patent
Chitturi et al.

(10) Patent No.: US 12,625,703 B2
(45) Date of Patent: *May 12, 2026

(54) MULTI-CARD PROCESSOR ACCESS FRAMEWORK

(71) Applicant: Truist Bank, Charlotte, NC (US)

(72) Inventors: Naga Mrudula Kalyani Chitturi, Charlotte, NC (US); Glenn S. Bruce, Woodstock, GA (US); Manikandan Dhanabalan, Cumming, GA (US); Gopinath Rajagopal, Cary, NC (US); Harish Dindi, Cumming, GA (US); Vijay Srinivasan, Alpharetta, GA (US); Jay Poole, Atlanta, GA (US)

(73) Assignee: Truist Bank, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/919,332

(22) Filed: Oct. 17, 2024

(65) Prior Publication Data

US 2025/0045051 A1    Feb. 6, 2025

Related U.S. Application Data

(63) Continuation of application No. 18/364,971, filed on Aug. 3, 2023, now Pat. No. 12,153,923.

(51) Int. Cl.
*G06F 9/38* (2018.01)
*G06F 9/30* (2018.01)

(52) U.S. Cl.
CPC .......... *G06F 9/3004* (2013.01); *G06F 9/3877* (2013.01)

(58) Field of Classification Search
CPC ...... G06F 9/3877; G06Q 20/00; G06Q 20/08; G06Q 20/34; G06Q 20/38; G06Q 20/40
See application file for complete search history.

(56) References Cited

U.S. PATENT DOCUMENTS

| | | | |
|---|---|---|---|
| 9,448,827 B1 | 9/2016 | Allen | |
| 2004/0083184 A1* | 4/2004 | Tsuei | G06Q 20/383 705/74 |

(Continued)

OTHER PUBLICATIONS

U.S. Appl. No. 18/364,971 , "Notice of Allowance", Sep. 18, 2024, 8 pages.

*Primary Examiner* — Jacob Petranek
(74) *Attorney, Agent, or Firm* — Kilpatrick Townsend & Stockton LLP; Michael A. Springs, Esq.

(57) ABSTRACT

A supplemental computing system can provide card services while saving processing power of a data center for other tasks. For example, the supplemental computing system described herein can include a processor and a memory that includes instructions that are executable by the processor to perform operations. The operations can include receiving a first subset of card requests. The operations can further include performing at least one servicing task to a card request resulting in an altered card request. Additionally, the operations can include selecting, for each altered card request in the first subset, a secondary card processor from at least one secondary card processor. The operations can also include transforming the altered card request into a secondary card processor specific card request suitable for the selected secondary card processor. The operations can include submitting the secondary card processor specific card request to the selected secondary card processor.

20 Claims, 4 Drawing Sheets

(56) References Cited

U.S. PATENT DOCUMENTS

| | | | |
|---|---|---|---|
| 2010/0050249 A1* | 2/2010 | Newman | H04L 63/20 |
| | | | 726/15 |
| 2012/0023009 A1 | 1/2012 | Pazlar et al. | |
| 2015/0095225 A1 | 4/2015 | Appana et al. | |
| 2019/0019169 A1 | 1/2019 | Mclaughlin et al. | |
| 2020/0104843 A1 | 4/2020 | Bhasin | |
| 2020/0356992 A1 | 11/2020 | Quigley et al. | |
| 2024/0112188 A1* | 4/2024 | Bedi | G06Q 20/4014 |

* cited by examiner

300

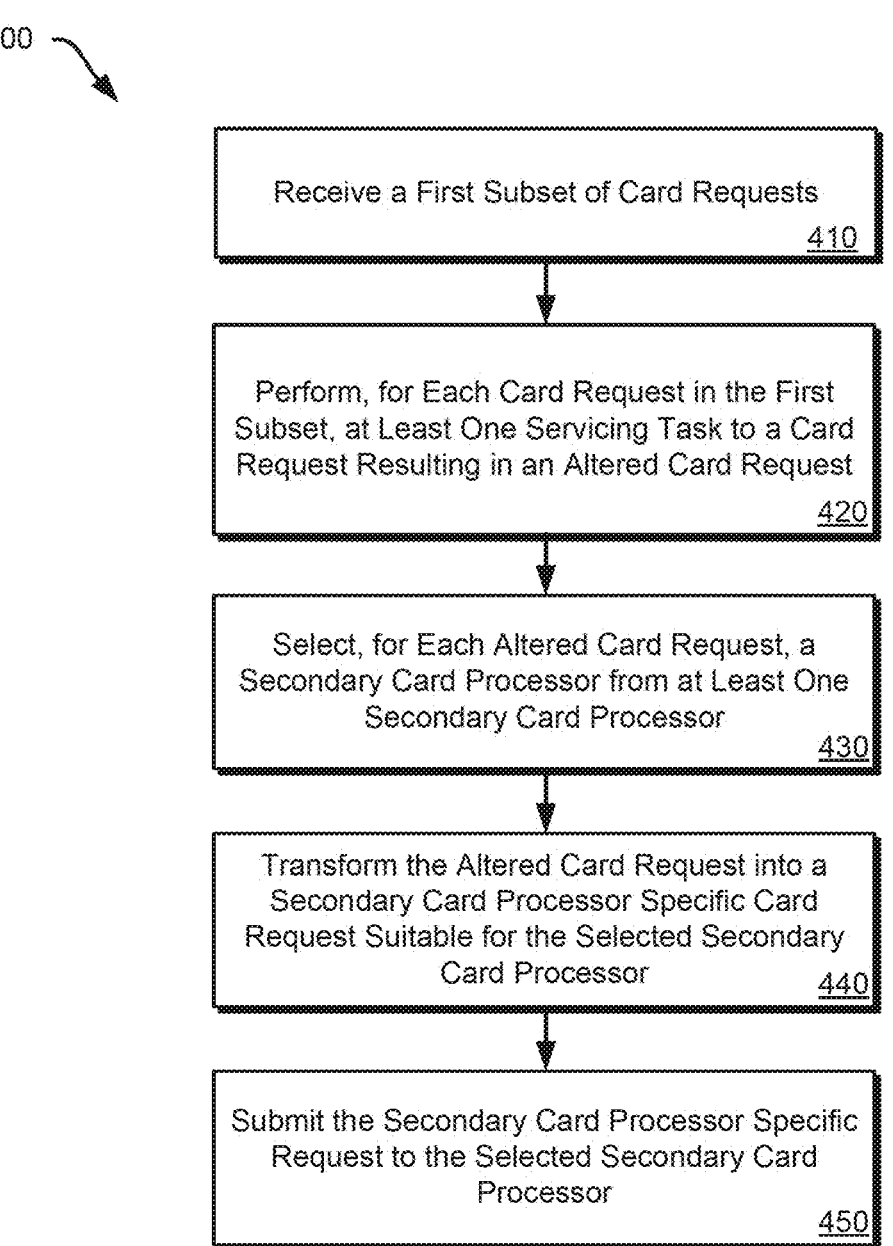

400

Receive a First Subset of Card Requests

410

Perform, for Each Card Request in the First Subset, at Least One Servicing Task to a Card Request Resulting in an Altered Card Request

420

Select, for Each Altered Card Request, a Secondary Card Processor from at Least One Secondary Card Processor

430

Transform the Altered Card Request into a Secondary Card Processor Specific Card Request Suitable for the Selected Secondary Card Processor

440

Submit the Secondary Card Processor Specific Request to the Selected Secondary Card Processor

MULTI-CARD PROCESSOR ACCESS FRAMEWORK

CROSS-REFERENCE TO RELATED APPLICATIONS

The present application is a continuation of U.S. patent application Ser. No. 18/364,971, filed Aug. 3, 2023, titled "MULTI-CARD PROCESSOR ACCESS FRAMEWORK", the entirety of which is incorporated herein by reference.

TECHNICAL FIELD

The present disclosure relates generally to card processing and, more particularly (although not necessarily exclusively), to a framework for handling multiple types of card processors.

BACKGROUND

Data centers can transmit and service card events for multiple card processors. Data centers can be designed to service card requests with the multiple card processors. There can be a limit to an amount and types of card processors with multiple processors that a data center can process before resources of the data center become limited.

SUMMARY

A data center can be assisted in servicing multiple card processors. For example, a system described herein can include a data center. The data center can include a processor and a memory. The memory can include instructions executable by the processor to perform operations. The operations can include transmitting a first subset of card requests to a supplemental computing system. For each card request in a second subset of card requests, the operations can also include performing at least one servicing task to the card request in the second subset resulting in an altered card request in the second subset. For each altered card request in the second subset, the operations can further include selecting a primary card processor from a group of primary card processors. Additionally, the operations can include transforming the altered card request of the second subset into a card processor specific card request suitable for the selected primary card processor. The operations can also include submitting the card processor specific card request to the selected card processor. The system can also include a supplemental computing system. The supplemental computing system can include a supplemental processor and supplemental memory. The supplemental memory can include instructions that are executable by the supplemental processor to perform supplemental operations. The supplemental operations can include receiving the first subset of card requests. For each card request in the first subset, the supplemental operations can include performing at least one servicing task to the card request in the first subset, resulting in an altered card request in the first subset. For each altered card request in the first subset, the supplemental operations can further include selecting a secondary card processor from at least one secondary card processor. Each secondary card processor can be a different type of card processor than any of the primary card processors. Additionally, the supplemental operations can include transforming the altered card request of the first subset into a secondary card processor specific card request suitable for the selected secondary card processor. The supplemental operations can also include submitting the secondary card processor specific card request to the selected secondary card processor.

In another example, a computer-implemented method can include receiving a first subset of card requests. The computer-implemented method can also include performing, while saving processing power of a data center for other tasks, for each card request in the first subset, at least one servicing task to a card request resulting in an altered card request. Additionally, the computer-implemented method can include selecting, for each altered card request in the first subset, a secondary card processor from at least one secondary card processor. Each secondary card processor can be a different type of card processor than any primary card processor in a group of primary card processors. The computer-implemented method can further include transforming the altered card request into a secondary card processor specific card request suitable for the selected secondary card processor. The computer-implemented method can also include submitting the secondary card processor specific card request to the selected card processor.

In another example, a supplemental computing system described herein can include a processor and a memory. The memory can include instructions that are executable by the processor to perform operations. The operations can include receiving a first subset of card requests. The operations can further include performing, while saving processing power of a data center for other tasks, for each card request in the first subset, at least one servicing task to a card request resulting in an altered card request. Additionally, the operations can include selecting, for each altered card request in the first subset, a secondary card processor from at least one secondary card processor. Each secondary card processor can be a different type of card processor than any primary card processor in a group of primary card processors. The operations can further include transforming the altered card request into a secondary card processor specific card request suitable for the selected secondary card processor. The operations can also include submitting the secondary card processor specific card request to the selected card processor.

BRIEF DESCRIPTION OF THE DRAWINGS

FIG. 4 is a flow chart of a computer-implemented process for assisting a data center in submitting card requests to multiple types of access card processors according to one example of the present disclosure.

DETAILED DESCRIPTION

Certain aspects and examples of the present disclosure relate to a data center that includes a supplemental computing system that can provide card services to card requests for card processors. The card processors that the supplemental computing system can service can be of a different type than the card processors that the data center can service directly. In some examples, the supplemental computing system can be in a separate closed environment from the data center. By providing the card services for the card processors, the supplemental computing system can save processing power of the data center for other tasks.

The supplemental computing system can be particularly useful in situations where the data center handles more types of card processors or more types of card requests than the data center is capable of handling based on an original design of the data center. These situations can occur because of a merger of server operators. For example, prior to a merger, the data center can service two types of card processors. After the merger, for example, the data center can service two additional types of card processors for a total of four types of card processors. Additionally, these situations can occur when a set of card processors undergo a change or a migration from one system to another. During a transition period before the migration is complete, some card processors can be updated with a new system and some other card processors can still apply an older version of the system.

The supplemental computing system can provide services for one or both of the additional card processors, saving some processing power of the data center for other tasks. The supplemental computing system can perform servicing tasks while meeting card community standards, cyber security standards, and data security standards. Examples of the supplemental computing system can include cloud platforms, Internet of Things (IoT) platforms, hardware platforms, mobile platforms, etc. In some examples, the supplemental computing system can supplement computing power for the data center while the data center receives upgrades to handle additional types of access card processors.

Illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

Figure 1:
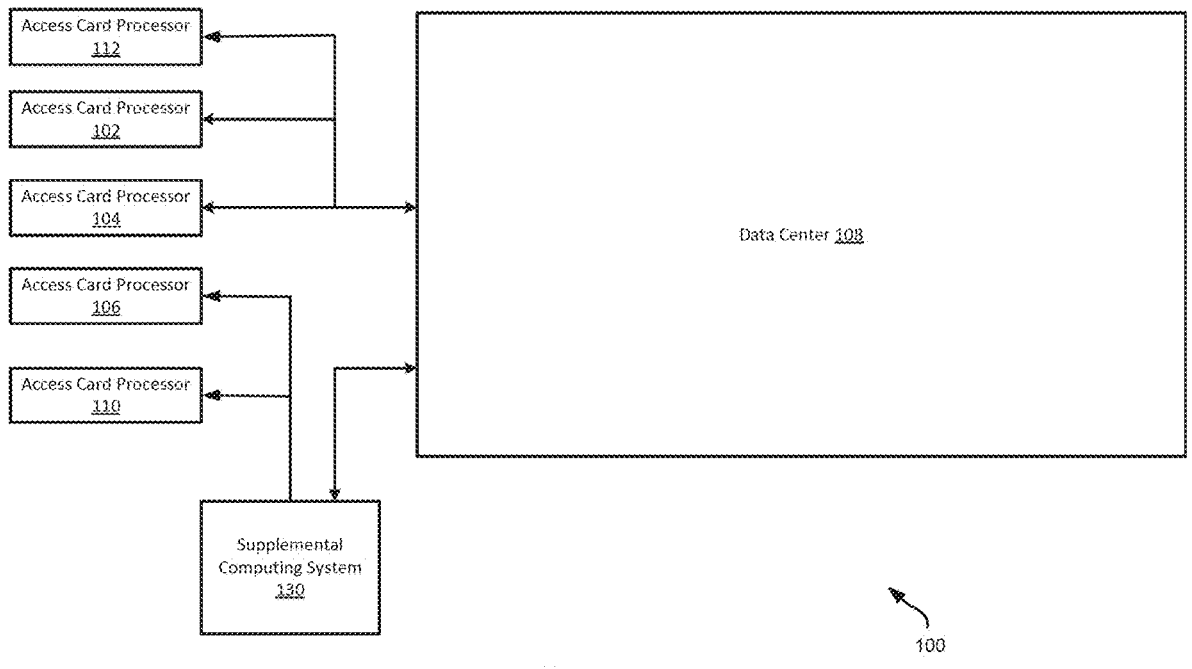
FIG. 1 is a schematic of a multiple card processor environment for assisting a data center in submitting card requests to multiple types of card processors according to one example of the present disclosure.

FIG. 1 is a schematic of a multiple card processor environment 100 for assisting a data center in submitting card requests to multiple types of card processors according to one example of the present disclosure. The multiple card processor environment 100 can include several card processors, a supplemental computing system 130, and a data center 108. The card processors can include card processor 102, card processor 104, card processor 106, card processor 113, and card processor 110. Card processor 102, card processor 104, and card processor 132 can be considered primary card processors. Card processor 106 and card processor 110 can be considered secondary card processors. Card processor 102, card processor 104, card processor 106, card processor 132, and card processor 110 can each be different types of card processors. Although three primary card processors are shown in multiple card processor environment 100, a multiple card processor environment can include any number of primary card processors, even a single primary card processor. Although two secondary card processors are shown in multiple card processor environment 100, the multiple card processor environment can include any number of secondary card processors, even a single secondary card processor. Card processors can manage card requests from service operators or other sources, such as the data center 108 or supplemental computing system 130, that can provide services associated with the card requests and an account or channel application associated with a card.

A card request can be initiated by an interaction between the access card and a device, such as a card chip reader, maintained by the data center 108. In some examples, the card does not need to be present to initiate the card request. For example, the card request can be an online request. Initiating the online request can involve card information provided by a user of the card to a website associated with or connected to the data center 108. Authenticating the online request can include additional information provided by the user, such as an expiration date for the card or a multiple digit verification code associated with the card.

Each card processor and the data center 108 can send and receive communication with the supplemental computing system 130 over one or more communication networks. Each card processor and the data center 108 can send and receive communication with each other as well. The one or more communication networks may correspond to one or more Wide Area Networks ("WANs"), such as the Internet, through which the supplemental computing system 130, each card processor, and the data center 108 may communicate with servers via web browsers or client-side applications, to establish communication sessions, request and receive web-based resources, and access other features of applications or services.

As depicted in FIG. 1, the data center 108 can receive, perform service tasks for, intelligently route card requests, manage formats for at least some of the card requests, and submit at least some of the card requests to card processors. Intelligently routing card requests can involve determining an appropriate card processor to process each card request and transmitting a subset of card requests to the supplemental computing system 130. Although the data center 108 is depicted in FIG. 1 as servicing and directly submitting card requests for two card processors, the data center 108 can service and directly submit card requests for any number of card processors, including a single card processor. Resolving card requests can involve transferring amounts of value between accounts associated with the card and accounts or channel applications associated with the data center 108. The data center 108 can be associated with a user, a server operator, or both.

As depicted in FIG. 1, the supplemental computing system 130 can receive card requests from the data center 108, perform service tasks for card requests, manage formats for card requests, and submit card requests to card processor 106. Examples of the supplemental computing system 130 can include cloud platforms, Internet of Things (IoT) platforms, hardware platforms, mobile platforms, etc. Although the supplemental computing system 130 is depicted in FIG. 1 as submitting card requests to a single card processor, the supplemental computing system 130 can submit card requests to any number of card processors. The supplemental computing system 130 can also transmit updates related to submitted card requests from card processor 106 back to the data center 108.

Examples of servicing tasks that the supplemental computing system 130 can perform can include checking to see if the access card request is a fraudulent access card request, verifying that personal information embedded in the card request is secure, validating an authenticity of the card request, verifying completeness of account data included in the card request, or approving the access card request.

Examples of servicing tasks can also include determining a location of origin and a timestamp for the access card request.

Checking to see if the access card request is a fraudulent access card request can involve comparing the location of origin and the timestamp for the access card request to locations of origin and timestamps of other recent access card requests associated with an access card. For example, the supplemental computing system 130 can find a time difference between the timestamp for the access card request and a timestamp for the most recent access card request of the other recent access card requests. The supplemental computing system 130 can also determine a distance based on the location of origin for the access card request and a location of origin for the most recent access card request. If a user cannot reasonably travel the distance within the time difference (considering top speeds of vehicles or airplanes), the supplemental computing system 130 can flag the access card request as a fraudulent access card request and disapprove the access card request.

Figure 2:
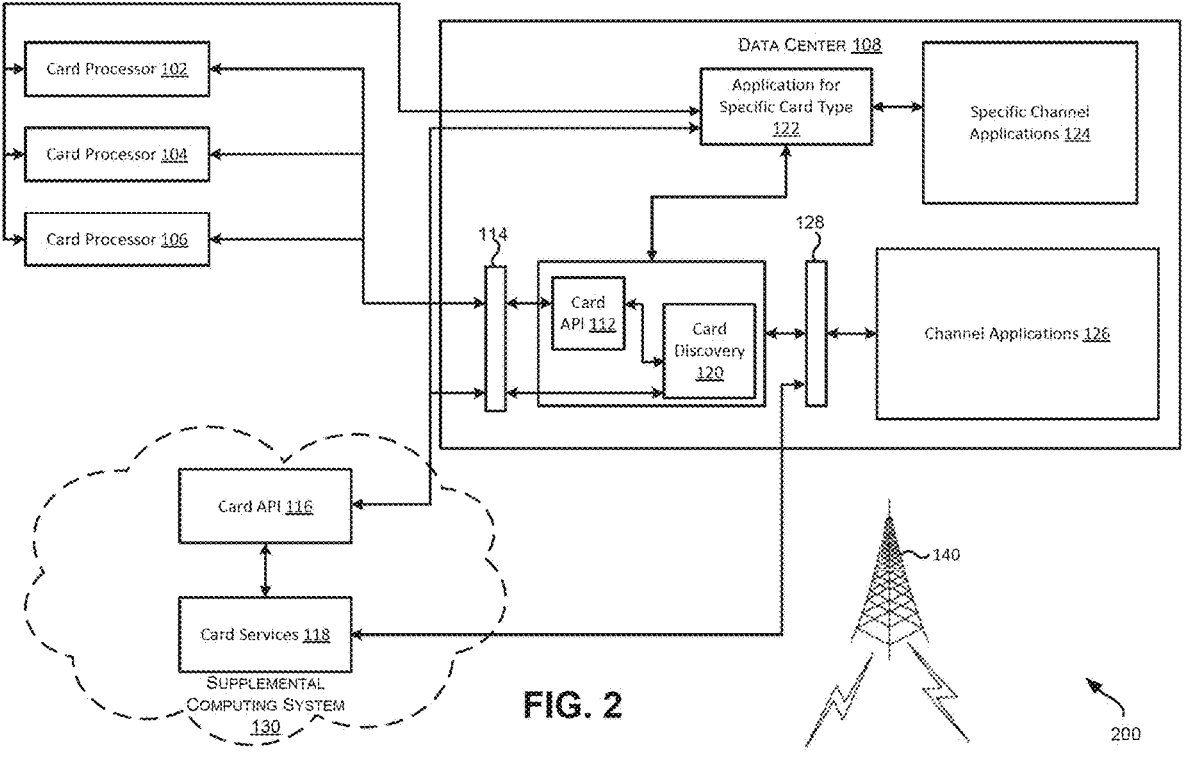
FIG. 2 is a schematic of another multiple card processor environment for assisting a data center in submitting card requests to multiple types of card processors according to one example of the present disclosure.

FIG. 2 is a schematic of another multiple card processor environment 200 for assisting a data center 108 in submitting card requests to multiple types of card processors according to one example of the present disclosure. The multiple card processor environment 200 can include card processors, a supplemental computing system, and a data center 108. The card processors can include card processor 102, card processor 104, and card processor 106. Although there are three card processors depicted in FIG. 2, the multiple card processor environment 200 can include any number of card processors.

Each card processor and the data center 108 can send and receive communication with the supplemental computing system 130 over one or more communication networks. The one or more communication networks may correspond to one or more Wide Area Networks ("WANs"), such as the Internet, through which the supplemental computing system 130, each card processor, and the data center 108 may communicate with servers via web browsers or client-side applications, to establish communication sessions, request and receive web-based resources, and access other features of applications or services.

The supplemental computing system 130 can include a card application programming interface (API) 116 and a card services 118 application. The data center 108 can include an API proxy 114, an API gateway 128, a card API 112, a card discovery 120 application, and channel applications 126. The data center 108 can also include an application for a specific card type 122 and specific channel applications 124.

The channel applications 126 and specific channel applications 124 can generate card requests. The API gateway 128 can receive channel card requests directly from the channel applications 126. The API gateway 128 can transfer the channel card requests to the card API 114 of the data center 108. Specific card requests can be generated by the specific channel applications 124 and transmitted to the application for the specific card type 122. In some examples, channel card requests from the channel applications 126 can be transmitted to the application for the specific card type 122. The application for the specific card type 122 can be loaded with data sent by any of the card processors, including card processor 102, card processor 104, or card processor 106. The card API 114 can receive the data from the application for the specific card type 122. The card API 114 can analyze and intelligently route each card request received, including channel card requests and specific card requests. For each card request, the card API 114 can determine a destination card processor for the card request. For example, the card API 114 can determine that a first subset of card requests is to be processed by card processor 106 and a second subset of card requests is to be processed by card processor 102 or card processor 104.

The first subset of card requests can be transmitted to the card API 116 of the supplemental computing system 130 via the API proxy 114. The card services 118 application of the supplemental computing system 130 can perform servicing tasks to each card request of the first subset of card requests, resulting in altered card requests of the first subset. In some examples, the API gateway 128 can provide updated data to the card services 118 application. The updated data can allow the card services 118 application to effectively perform servicing tasks. The card API 116 can transform the altered card requests of the first subset into processor specific card requests suitable for card processor 106. This transformation may involve customizing the specific card requests of the first subset to meet one or more requirements of the card processor 106, for example, so that the specific card requests have a format and/or dataset required by the card processor 106. The card API 116 can submit the specific card requests of the first subset to the card processor 106 via the API proxy 114 for processing. Card processors, like card processor 106, that receive specific card requests from the supplemental computing system 130 can be referred to as secondary card processors. In some examples, the secondary card processors can include any of the card processors, including card processor 104 or card processor 102.

The second subset of card requests can be transmitted to the card API 112 of the data center 108. The card discovery 120 application of the data center 108 can perform servicing tasks to each card request of the second subset of card requests, resulting in altered card requests of the second subset. The card API 112 can transform the altered card requests of the second subset into processor specific card requests suitable for either card processor 104 or card processor 102. This transformation may involve customizing the specific card requests of the first subset to meet one or more requirements of either the card processor 104 or card processor 102, for example, so that the specific card requests have a format and/or dataset required by the card processor 104 or the card processor 102. The card API 112 can submit the specific card requests of the second subset via the API proxy 114 to either the card processor 104 or card processor 102 for processing. Card processors, like card processor 104 or card processor 102, that receive specific card requests from the card API 112 can be referred to as primary card processors. In some examples, the primary card processors can include any of the card processors including card processor 106. In some examples, card processors included as primary card processors can overlap with card processors included as secondary card processors.

Examples of card processors can include a Fidelity Information Services (FIS)/Compute Express Link (CxL) processor, a FD/TLP processor, or a Total Systems (TSYS)/TLP processor. Examples of the channel applications 126 can include mobile applications, client central applications, a teller, an ATM, or an interactive voice response (IVR) application.

The application for specific card type 122 can perform service tasks associated with the specific card type to the specific card requests received from the specific channel applications 124. Examples of the specific channel applications 124 can include a Data Lake application, an application associated with deposits, an on-demand archive, a general ledger application, or a cost, insurance, and freight (CIF) application.

Figure 3:
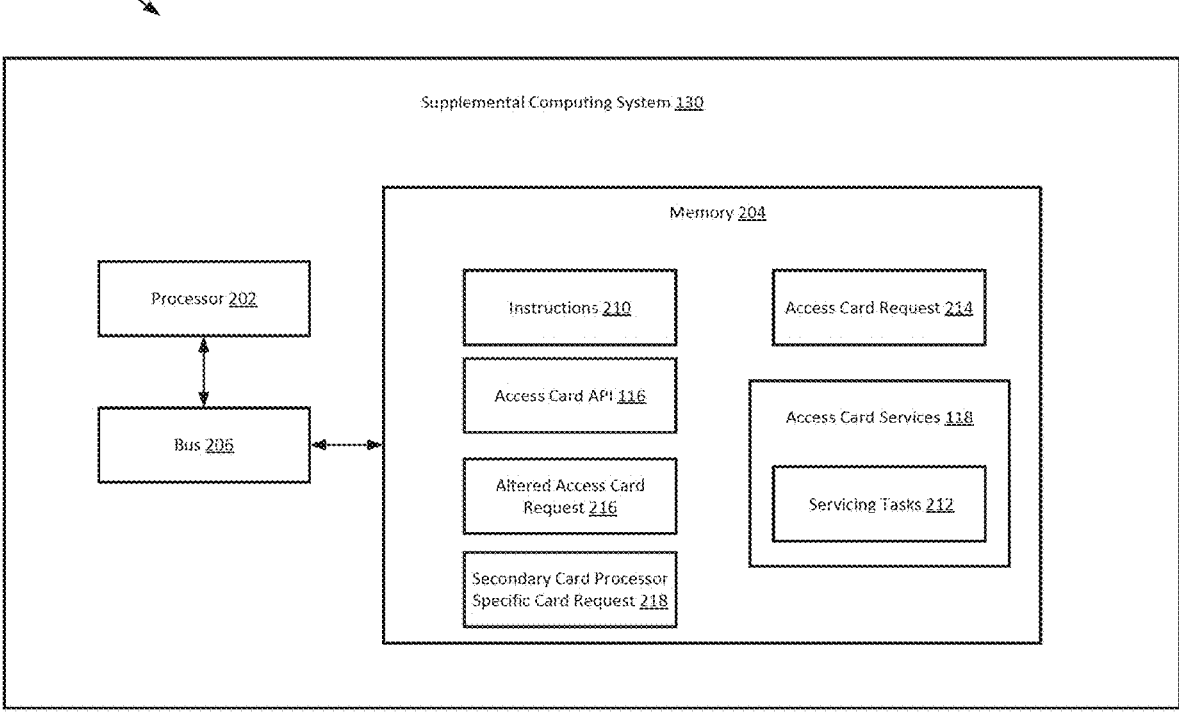
FIG. 3 is a block diagram of a supplemental computing system for assisting a data center in submitting card requests to multiple types of card processors according to one example of the present disclosure.

FIG. 3 is a block diagram of a supplemental computing system 130 for assisting a data center in submitting card requests to multiple types of access card processors according to one example of the present disclosure. The components shown in FIG. 3, such as a processor 202, a memory 204, a bus 206, and the like, may be integrated into a single structure such as within the single housing of the supplemental computing system 130. Alternatively, the components shown in FIG. 3 can be distributed from one another and in electrical communication with each other.

As shown, the supplemental computing system 130 includes the processor 202 communicatively coupled to the memory 204 by the bus 206. The processor 202 can include one processor or multiple processors. The processor 202 can be referred to as a supplemental processor and the memory 204 can be referred to as a supplemental memory. Non-limiting examples of the processor 202 include a Field-Programmable Gate Array (FPGA), an application specific integrated circuit (ASIC), a microprocessor, or any combination of these. The processor 202 can execute instructions 210 stored in the memory 204 to perform operations. In some examples, the instructions 210 can include processor-specific instructions generated by a compiler or an interpreter from code written in any suitable computer-programming language, such as C, C++, C#, Python, or Java.

The memory 204 can include one memory device or multiple memory devices. The memory 204 can be non-volatile and may include any type of memory device that retains stored information when powered off. Non-limiting examples of the memory 204 include electrically erasable and programmable read-only memory (EEPROM), flash memory, or any other type of non-volatile memory. At least some of the memory 204 can include a non-transitory computer-readable medium from which the processor 202 can read instructions 210. The non-transitory computer-readable medium can include electronic, optical, magnetic, or other storage devices capable of providing the processor 202 with the instructions 210 or other program code. Non-limiting examples of the non-transitory computer-readable medium include magnetic disk(s), memory chip(s), RAM, an ASIC, or any other medium from which a computer processor can read the instructions 210.

The memory 204 can further include a card API 116, a card services 118 application, a card request 214, an altered card request 216, and a secondary card processor specific card request 218. The card services 118 application can include servicing tasks 212. The card API 116 can receive the card request 214 from the data center. The card services 118 application can perform servicing tasks to the card request 214 resulting in the altered card request 216. The card API 116 can transform the altered card request 216 into the secondary card processor specific card request 218. The card API 116 can submit the secondary card processor specific card request 218 to a selected secondary card processor for additional processing.

In some examples, the supplemental computing system 130 can implement the process shown in FIG. 4 for effectuating some aspects of the present disclosure. Other examples can involve more operations, fewer operations, different operations, or a different order of the operations shown in FIG. 4.

FIG. 4 is a flow chart of a computer-implemented process 400 for assisting a data center in submitting card requests to multiple types of access card processors according to one example of the present disclosure. Operations of methods may be performed by software, firmware, hardware, or a combination thereof. The operations of the computer-implemented process 400 start at block 410.

At block 410, the computer-implemented process 400 involves receiving a first subset of card requests. The first subset of card requests can be received by a supplemental computing system from the data center. The data center can intelligently route card requests based on a destination card processor for each card request. An example of the supplemental computing system can be supplemental computing system 130 depicted in FIGS. 1-3. An example of the data center can be data center 108 from FIG. 1 or FIG. 2. The supplemental computing system can specialize in submitting card requests to at least one secondary card processor. The at least one secondary card processor can include any number of card processors, including one secondary card processor. In some examples, the first subset of card requests can be received by an card API 116 of the supplemental computing system.

At block 420, the computer-implemented process 400 involves for each card request in the first subset of card requests, performing, while saving processing power of the data center, at least one servicing task to a card request 214 within the first subset of card requests resulting in an altered card request 216 in the first subset. A card services application of the supplemental computing system can perform the at least one servicing task to the card request 214. The card services 118 application can be designed specifically for the at least one secondary card processor. The card services 118 application can perform the at least one servicing task while meeting card community standards, cyber security standards, and data security standards.

Examples of servicing tasks 212 that the card services 118 application can perform can include checking to see if the card request 214 is a fraudulent card request, verifying that personal information embedded in the card request is secure, validating an authenticity of the card request, verifying completeness of account data included in the card request, determining that a user account associated with the card request 214 meets a minimum criterion for completion of the card request 214, or approving the card request. The examples of servicing tasks can also include determining a location of origin and a timestamp for the card request 214.

Checking to see if the card request 214 is a fraudulent access card request can involve comparing the location of origin and the timestamp for the card request 214 to locations of origin and timestamps of other recent card requests associated with a card. For example, the card services 118 application can find a time difference between the timestamp for the card request 214 and a timestamp for the most recent card request of the other recent card requests. The card services 118 application can also determine a distance based on the location of origin for the card request 214 and a location of origin for the most recent card request. If a user cannot reasonably travel the distance within the time difference (considering top speeds of vehicles or airplanes), the card services 118 application can flag the card request 214 as a fraudulent card request and disapprove the card request 214.

Determining that a user account associated with the card request 214 meets a minimum criterion for completion of the card request 214 can involve determining that the user account maintains a minimum balance for the user to qualify for the card. In some examples, the card services 118 application can recognize that a card request will "max out" an amount of value associated with the card and can deny the card request. A card can be "maxed out" when an outstanding balance associated with the card exceeds a threshold amount. The card services 118 application can also provide account management services. Examples of account management services can include automatically notifying a user of a "max out" event or a fraudulent card request, automatically transferring an amount from a back-up card to avoid a "max out" event, etc.

At block 430, the computer-implemented process 400 involves for each altered card request in the first subset, selecting a secondary card processor from at least one secondary card processor. Each secondary card processor of the at least one secondary card processor can be a different type of card processor than any card processor in a group of primary card processors. The card services 118 application of the supplemental computing system can select the secondary card processor.

At block 440, the computer-implemented process 400 involves transforming the altered card request 216 of the first subset into a secondary card processor specific card request 218 suitable for the selected secondary card processor. This transformation may involve customizing the secondary card processor specific card request 218 to meet one or more requirements of the selected secondary card processor, for example, so that the secondary card processor specific card request 218 has a format and/or dataset required by the selected secondary card processor. The card API 116 of the supplemental computing system can perform the transformation.

At block 450, the computer-implemented process 400 involves submitting the secondary card processor specific card request 218 of the first subset to the selected secondary card processor. The card API 116 can relay the secondary card processor specific card request 218 to the selected secondary card processor. In some examples, the supplemental computing system can receive updates from the selected card processor regarding a processing status of the secondary card processor specific card request 218. The supplemental computing system can relay the updates back to a channel application within the data center. The channel application can be an original source of the card request.

Processing card requests can involve transferring amounts of value between accounts associated with the card and accounts associated with a server operator involved in the secondary card processor specific card request 218. The data center 108 can be associated with the user, the server operator, or both.

In some examples, the card API 116 of the supplemental computing system 130 can provide status updates for the card request 214 to the data center. The card API 112 of the data center 108 can provide additional information to update data for the card API 116 application of the supplemental computing system 130. The updated data can allow the card services 118 application to effectively perform servicing tasks 212.

In an example, a multiple card environment includes three card processors, two primary card processors and one secondary card processor. The secondary card processor can be a different type of card processor than the two primary card processors.

Each of the three card processors can process card requests. A card API of a data center can submit card requests from a second subset of card requests directly from to two primary access card processors via an API proxy. A card discovery application of the data center can perform servicing tasks to each card request in the second subset of card requests received by the card API of the data center resulting in altered card requests in the second subset. Examples of servicing tasks that the card discovery application can perform can include checking to see if the card request is a fraudulent card request, verifying that personal information embedded in the card request is secure, validating an authenticity of the card request, verifying completeness of account data included in the card request, determining that a user account associated with the card request meets a minimum criterion for completion of the card request, or approving the card request.

For each card request in the second subset, the card discovery application can select a primary card processor from a group of primary card processors. The card API of the data center can transform the altered card request in the second subset into a card processor specific card request. The card processor specific card request can be suitable for the selected primary card processor. The card API of the data center can submit the card processor specific card request to the selected primary card processor.

A card API of a supplemental computing system can receive a first subset of card requests from the data center. In some examples, a mule proxy of the data center can send the first subset to the card API of the supplemental computing system. Card requests received by the supplemental computing system can be referred to as secondary card requests. A card services application of the supplemental computing system can perform servicing tasks to each secondary card request received by the card API of the supplemental computing system, resulting in altered secondary card requests.

For example, the card services application can take steps to determine if a secondary card request is a fraudulent card request. The secondary card request can be associated with a particular card. The card services application can determine a location of origin and a timestamp for the secondary card request. The location of origin can be a location of a card reader or a location of a personal computer console where an online card request originated.

The card services application can compare the location and timestamp of the secondary card request to locations and timestamps associated with other card requests from the same particular card. A location for the most recent card request from among the other card requests can be used to determine a distance traveled between the secondary request and the most recent card request. A timestamp for the most recent card request can be used to determine a duration of time between the most recent card request and the secondary card request. An average speed between consecutive requests can be determined by dividing the distance traveled by the determined duration of time. In the example, the card services application determines an average speed between consecutive requests to be 15 mph and does not flag the secondary card request as a fraudulent card request since many vehicles can travel at speeds above 15 mph.

The card services application can approve the secondary card request and can transmit a notification of the approval to the data center. The card services application can, for each altered secondary card request, select a secondary card processor from at least one secondary processor. The card services application can further transform the altered secondary card request into a card processor specific secondary card request. This transformation may involve customizing the card processor specific secondary card requests of the first subset to meet one or more requirements of the selected secondary card processor, for example, so that the specific secondary card request has a format and/or dataset required by the selected secondary card processor.

The supplemental computing system can submit the card processor specific secondary card request to the selected secondary card processor. The selected secondary card processor can process the specific secondary card request. In some examples, the selected secondary card processor can provide updates to the supplemental computing system regarding the card processor specific secondary card request. The supplemental computing system can relay the updates to the data center. For example, the updates can include a notification that a processing of the card processor specific secondary card request will be delayed due to a high volume of card requests.

In some examples, an application for specific card type of the data center can provide updated data to the card services 118 application of the supplemental computing system. The updated data can allow the card services 118 application to effectively perform servicing tasks.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A computing system communicatively coupled with a data center, the computing system comprising:
  a processor; and
  a memory that includes instructions executable by the processor to perform operations comprising:
    receiving a first subset of card requests, the first subset of card requests configured to be routed by the data center that is communicatively coupled with a primary card processor and at least one secondary card processor;
    for each card request in the first subset, performing at least one servicing task to the card request in the first subset resulting in an altered card request in the first subset;
    for each altered card request in the first subset, selecting a secondary card processor from the at least one secondary card processor, each secondary card processor of the at least one secondary card processor being a different type of card processor than the primary card processor;
    transforming the altered card request of the first subset into a secondary card processor specific card request suitable for the selected secondary card processor; and
    submitting the secondary card processor specific card request to the selected secondary card processor.

2. The computing system of claim 1, wherein the data center comprises:
  a second processor; and
  a second memory that includes instructions executable by the second processor to perform operations comprising:
    transmitting the first subset of card requests to the computing system;
    for each card request in a second subset of card requests, performing at least one servicing task to the card request in the second subset resulting in an altered card request in the second subset;
    for each altered card request in the second subset, selecting the primary card processor from a plurality of primary card processors;

transforming the altered card request of the second subset into a card processor specific card request suitable for the selected primary card processor; and
    submitting the card processor specific card request to the selected primary card processor.

3. The computing system of claim 2, wherein the plurality of primary card processors comprises two primary card processors, and wherein the at least one secondary card processor comprises one secondary card processor.

4. The system of claim 1, wherein the operation of performing the at least one servicing task to the card request in the first subset comprises checking to see if the card request is a fraudulent access card request, and wherein the operation of performing the at least one servicing task to the card request in the first subset further comprises determining a location of origin and a timestamp for the card request.

5. The system of claim 4, wherein the operation of checking to see if the card request in the first subset is a fraudulent card request comprises comparing the location of origin and the timestamp for the card request to locations of origin and timestamps of other recent card requests associated with a card.

6. The system of claim 1, wherein the operation of performing the at least one servicing task to the card request in the first subset comprises determining that a user account associated with the card request meets a minimum criterion for completion of an access card request.

7. The system of claim 1, wherein the operations performable by the system are configured to meet card community standards.

8. A computer-implemented method comprising:
  receiving a first subset of card requests, the first subset of card requests configured to be routed by the data center that is communicatively coupled with a primary card processor and at least one secondary card processor;
  for each card request in the first subset, performing at least one servicing task to the card request in the first subset resulting in an altered card request in the first subset;
  for each altered card request in the first subset, selecting a secondary card processor from at least one secondary card processor, each secondary card processor of the at least one secondary card processor being a different type of card processor than the primary card processor;
  transforming the altered card request of the first subset into a secondary card processor specific card request suitable for the selected secondary card processor; and
  submitting the secondary card processor specific card request to the selected secondary card processor.

9. The computer-implemented method of claim 8, further comprising:
  transmitting the first subset of card requests to a computing system;
  for each card request in a second subset of card requests, performing at least one servicing task to the card request in the second subset resulting in an altered card request in the second subset;
  for each altered card request in the second subset, selecting the primary card processor from a plurality of primary card processors;
  transforming the altered card request of the second subset into a card processor specific card request suitable for the selected primary card processor; and
  submitting the card processor specific card request to the selected primary card processor.

10. The computer-implemented method of claim 9, wherein the plurality of primary card processors comprises two primary card processors, and wherein the at least one secondary card processor comprises one secondary card processor.

11. The computer-implemented method of claim 8, wherein performing the at least one servicing task to the card request in the first subset comprises checking to see if the card request is a fraudulent access card request, and wherein performing the at least one servicing task to the card request in the first subset further comprises determining a location of origin and a timestamp for the card request.

12. The computer-implemented method of claim 11, wherein checking to see if the card request in the first subset is a fraudulent card request comprises comparing the location of origin and the timestamp for the card request to locations of origin and timestamps of other recent card requests associated with a card.

13. The computer-implemented method of claim 8, wherein performing the at least one servicing task to the card request in the first subset comprises determining that a user account associated with the card request meets a minimum criterion for completion of an access card request.

14. The computer-implemented method of claim 8, wherein performing the at least one servicing task to the card request comprises performing the at least one servicing task while meeting card community standards.

15. A non-transitory computer-readable medium comprising instructions executable by a processor to cause the processor to perform operations comprising:

receiving a first subset of card requests, the first subset of card requests configured to be routed by the data center that is communicatively coupled with a primary card processor and at least one secondary card processor;

for each card request in the first subset, performing at least one servicing task to the card request in the first subset resulting in an altered card request in the first subset;

for each altered card request in the first subset, selecting a secondary card processor from at least one secondary card processor, each secondary card processor of the at least one secondary card processor being a different type of card processor than the primary card processor;

transforming the altered card request of the first subset into a secondary card processor specific card request suitable for the selected secondary card processor; and submitting the secondary card processor specific card request to the selected secondary card processor.

16. The non-transitory computer-readable medium of claim 15, wherein the operations further comprise:

transmitting the first subset of card requests to a computing system;

for each card request in a second subset of card requests, performing at least one servicing task to the card request in the second subset resulting in an altered card request in the second subset;

for each altered card request in the second subset, selecting the primary card processor from a plurality of primary card processors;

transforming the altered card request of the second subset into a card processor specific card request suitable for the selected primary card processor; and submitting the card processor specific card request to the selected primary card processor.

17. The non-transitory computer-readable medium of claim 16, wherein the plurality of primary card processors comprises two primary card processors, and wherein the at least one secondary card processor comprises one secondary card processor.

18. The non-transitory computer-readable medium of claim 15, wherein the operation of performing the at least one servicing task to the card request in the first subset comprises checking to see if the card request is a fraudulent access card request, wherein the operation of performing the at least one servicing task to the card request in the first subset further comprises determining a location of origin and a timestamp for the card request, wherein the operation of checking to see if the card request in the first subset is a fraudulent card request comprises comparing the location of origin and the timestamp for the card request to locations of origin and timestamps of other recent card requests associated with a card.

19. The non-transitory computer-readable medium of claim 18, wherein the operation of performing the at least one servicing task to the card request in the first subset comprises determining that a user account associated with the card request meets a minimum criterion for completion of an access card request.

20. The non-transitory computer-readable medium of claim 15, wherein the operation of performing the at least one servicing task to the card request comprises determining that a user account associated with the card request meets a minimum criterion for completion of the card request.

* * * * *